United States Patent Office 3,504,084
Patented Mar. 31, 1970

3,504,084
PLACENTAL EXTRACT AND METHOD OF PRODUCING THE SAME FROM HUMAN PLACENTA FOR USE IN RELIEVING RHEUMATIC DISEASES
Eugene F. Traut, Oak Park, Ill., assignor of one-half to Michael G. Mulinos, Westfield, N.J.
No Drawing. Continuation-in-part of application Ser. No. 373,847, June 9, 1964. This application Apr. 25, 1967, Ser. No. 633,379
Int. Cl. A61k 17/06
U.S. Cl. 424—105                     1 Claim

ABSTRACT OF THE DISCLOSURE

A placental extract and method of producing a water soluble human placental extract free of steroid hormones for treatment of rheumatic diseases of human beings which comprises removing membranes, blood clots and blood from freshly expelled human placenta, cutting the placenta into small pieces, adding a saline solution to the pieces, homogenizing the saline mixture in a blender, filtering the homogenate, centrifuging the filtrate, after which the filtrate is bottled, sterilized and quick frozen.

---

This application is a continuation-in-part application of United States patent application Ser. No. 373,847, filed June 9, 1964, now abandoned.

BACKGROUND OF THE INVENTION

Field of the invention

It is known that human placenta or the so-called afterbirth contains several hormones and other substances which have proved beneficial in the treatment of arthritis and rheumatism by intra-muscular or subcutaneous injection into the human body. Up to now, a large number of publications attest to the considerable difficulty encountered in extracting the desired active principles from the placenta.

Some have proposed to freeze the placenta to a solid condition, grind the frozen solids and then extract the hormones with solvents such as alcohol, ether and/or acetone. Others have proposed to treat the placenta with acidified alcohol and harsh chemicals to extract the hormones and thereafter chemically treat the extract to form a neutral precipitate. All of these methods produce an extract which contains water insoluble steroids having unwanted side effects, besides involving needless and time consuming steps.

SUMMARY OF THE INVENTION

In accordance with the present invention, it has been discovered that a totally different and improved water soluble placental extract can be produced which is free of steroid hormones. The method consists essentially in removing as much blood as possible from human placenta within one-half hour after childbirth or delivery, for example, by removing membranes and blood clots and washing the placenta with water, adding one cc. of sterile saline solution for each gram of placenta, breaking up the placenta into fine particles while in the saline solution, filtering the resulting mixture to separate undissolved matter therefrom, centrifuging the filtrate, withdrawing the supernatant liquid and sealing the same in a receptacle, the aforementioned steps being performed immediately in succession in the order named and under sterile conditions. Preferably, the resulting extract is heated while in the receptacle to sterilize the same. If not used immediately, the extract is frozen and maintained in frozen condition in the receptacle until used.

DESCRIPTION OF PREFERRED EMBODIMENT

As a specific example of carrying out the method in accordance with the present invention, placenta obtained from the obstetrical service was processed immediately because it has been found that after about one-half hour following childbirth there may be a loss in potency of the placenta. The freshly delivered placenta was stripped free of membranes, and adherent blood clots were removed. The placenta was then rinsed with sterile water to remove as much blood as possible to thereby avoid dilution of the potency of the extract.

A batch of placenta weighing 500 grams was cut up into small pieces; 500 cc. OF. sterile, saline solution having a concentration of about 0.9% as defined on page 596, U.S. Pharmacoepia, Edition XVII, were added and the mixture was placed in a Waring Blendor which was operated for about one-half hour to homogenize the placenta and break up the same into fine particles. Sterile physiological saline is used most frequently because this is available in the delivery room, in the operating room, in the wards, or in the pharmacy of the hospital. The homogenate was strained through steel wool and was then filtered through No. 1 filter paper. The filtrate was then centrifuged for one hour at 25,000 r.p.m. at 4° C., although the time, speed and temperature are not critical for obtaining an active aqueous placental extract.

The supernatant brown, unclear liquid was then poured into 10 cc. sterile, rubber capped bottles of the multiple dose type. The extract in the bottles was treated at 57° C. for two and one-half hours to assure sterility and thereafter was quick frozen and kept at −20° C., until used. The extract prepared in the foregoing described manner maintains its maximum activity for at least two weeks. One cc. of the extract represents the active ingredients in one-half gram of fresh placenta.

Preliminary tests were made with animals to prove that the extract is non-toxic. Mice were injected in an amount weekly representing 40 cc. per one kilogram of body weight. The safety of the extract in mice is emphasized by the fact that the total weekly human dose is 1 cc. or less per between 50 and 75 kilograms of body weight.

The placental extract is administered to human beings by intramuscular injection in the buttock or deltoid muscles under sterile conditions by means of a suitable hypodermic needle, such as No. 27, through which the extract can flow freely.

Extensive clinical trials were made to determine the safe and effective dose. At this time one cc. of the diluted extract was injected which amount corresponded to the volume of saline solution which had been injected during a preliminary study of placebo effects. At first, one cc. of a 1 to 50 dilution of the extract was injected and then the strength was increased to 1 to 10 dilution as safety precautions allowed.

On obtaining suggestive but mild improvement of the arthritic condition without local reaction at the site of injection or evidence of systemic toxicity or intolerance, treatment of other subjects was started with a dose of 0.1 cc. of the undiluted extract to establish a frame of reference. The dose was increased by 0.1 cc. depending upon the rate of improvement at each weekly visit. Patients experiencing relief lasting less than one week were injected every third day or twice weekly. The dose at any level was increased, was kept the same or was decreased depending upon the clinical effect reported by the patient and the observations of the examining physician who did not know whether or not the patient was receiving saline placebo or the placental extract. This is the so-called "double blind" technique used in connection with this type of treatment.

The results obtained by treatment with placental extract prepared in accordance with the present invention were astounding and gratifying. All patients had previously become unresponsive and were resistant to saline placebo injections. Some had been treated with other remedies without success.

Twenty-two patients with degenerative arthritis and ten patients with rheumatoid arthritis of all degrees of severity responded satisfactorily and promptly to the first and smallest dose of 0.1 cc. undiluted extract. One patient with typical rheumatoid disease responded only equivocally to a weekly dose of 0.3 cc. One patient with chronic gouty arthritis experienced a marked decrease in swelling, stiffness and pain following each weekly injection. Significantly, victims of low back and shoulder pain syndromes reported a marked decrease in pain and stiffness.

An unsolicited response was volunteered by many patients who enthusiastically claimed more strength and a sense of well being while being treated with the placental extract.

Improvement was noted within two to twelve hours after injection. The benefit usually lasted three to five days, decreasing gradually thereafter. Many patients reported that the relief from a single injection lasted as long as two weeks. After three to five injections, the manifestations of the disease were so much less that the patients entered a continuing new level of comfort not experienced since the inception of the illness.

It has been found that the placental extract in accordance with the present invention has numerous advantages. It contains no steroid chemicals because these are water insoluble and are filtered out. The placenta is a human tissue thereby eliminating the danger of allergic or sensitization reactions which occur when foreign protein is injected. No side effects were reported, even on prolonged treatment. Its administration lessened the need for analgetic and anti-inflammatory drugs or for gold and steroid therapy. The human placenta is processed in a simple, practical and economical manner. The method employed does not use harsh chemicals and therefore does not denature the proteins or cause loss of any of the active ingredients by adsorption, when chemically precipitated proteins are removed by filtration, as in other methods of extraction.

From the foregoing description, it will be seen that the present invention provides a method for producing an improved aqueous placental extract effective in the treatment of arthritis. As far as applicant is aware, such an aqueous extract of the placenta had not been reported previously.

What is claimed is:

1. The process of treating human placenta to produce an aqueous placental extract suitable for injection in the treatment of rheumatoid diseases of human beings, which process consists of removing membranes and blood clots from the placenta and rinsing the placenta to remove as much blood as possible therefrom within one-half hour after expulsion of the placenta, cutting the placenta into small particles, adding for each gram of placenta one cc. of saline solution having a concentration of about 0.9% to the placenta, placing the small particles into a blender and operating the blender for about one-half hour to homogenize and break the placenta into fine particles while in the saline solution, filtering the resulting mixture to separate undissolved matter therefrom, centrifuging the filtrate, withdrawing the supernatant liquid and placing the same in a receptacle, sealing the receptacle, heating the liquid at 57° C. for two and one-half hours while in the receptacle to sterilize the same, and quick freezing the liquid to about −20° C. and maintaining the same frozen in the receptacle until the extract is to be used, the aforementioned steps being performed immediately and in succession in the order named and under sterile conditions.

References Cited

UNITED STATES PATENTS

| 1,314,321 | 8/1919 | Fraenkel et al. | 424—105 |
| 1,625,360 | 4/1927 | Hartmann | 424—105 |
| 1,690,932 | 11/1928 | Hartmann | 424—105 |
| 1,692,509 | 11/1928 | Merki | 424—105 |
| 1,868,095 | 7/1932 | Dohrn et al. | 424—105 |
| 1,890,373 | 12/1932 | Fraenkel | 424—105 |
| 2,907,695 | 10/1959 | Adam et al. | 424—105 |
| 3,317,391 | 5/1967 | Granirer et al. | 424—105 |

OTHER REFERENCES

U.S. Dispensatory, 24th ed., 1947, pp. 506–7.

ALBERT T. MEYERS, Primary Examiner

F. E. WADDELL, Assistant Examiner